Figure 1:
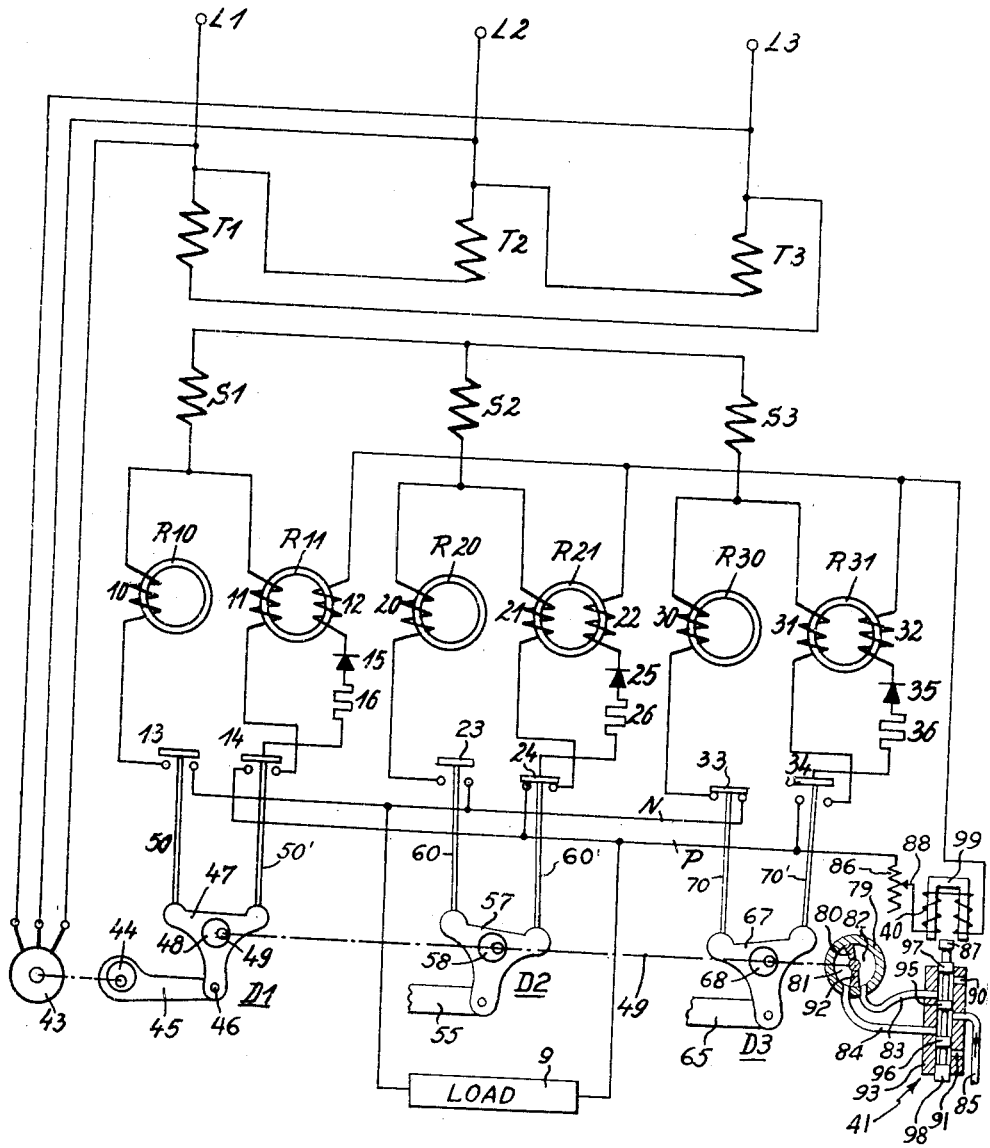

Nov. 6, 1956

HANS-JOACHIM KLEINVOGEL 2,769,951
MEASURING AND REGULATING APPARATUS
FOR ELECTRIC CONTACT CONVERTERS

Filed Dec. 21, 1951

2 Sheets-Sheet 1

Inventor:
HANS-JOACHIM KLEINVOGEL
BY Knight Brothers
ATTORNEYS

Nov. 6, 1956  HANS-JOACHIM KLEINVOGEL  2,769,951
MEASURING AND REGULATING APPARATUS
Filed Dec. 21, 1951  FOR ELECTRIC CONTACT CONVERTERS 2 Sheets-Sheet 2

Inventor:
HANS-JOACHIM KLEINVOGEL
BY
ATT'YS

United States Patent Office 2,769,951
Patented Nov. 6, 1956

2,769,951
MEASURING AND REGULATING APPARATUS FOR ELECTRIC CONTACT CONVERTERS

Hans-Joachim Kleinvogel, Berlin-Siemensstadt, Germany, assignor to Siemens-Schuckertwerke Aktiengesellschaft, Berlin-Siemensstadt, Germany, a corporation of Germany Application December 21, 1951, Serial No. 262,855

Claims priority, application Germany January 11, 1951

3 Claims. (Cl. 321—48)

My invention relates to contact rectifiers and the like mechanically operating converting apparatus for electric currents, and more particularly to plural-phase converting apparatus whose mutually phase-displaced contact devices, operating as synchronous switches with mutually overlapping commutation intervals, are series connected with respective saturable reactors. During the commutation intervals the reactors become unsaturated and, by the concomitant increase of their reactance, produce a weak-current step for an interval of time within which the respective contact devices are opened.

With such converting apparatus, the voltage can be varied or automatically regulated either by mechanical control of the contact devices, that is, by shifting the contact closing moments relative to the voltage cycle of the alternating input current (voltage control by "delayed commutation"), or by imposing a magnetic bias or properly chosen premagnetization upon the saturable series reactors at the switching-in moment of the respective contact devices. This requires a simultaneous adjustment or regulation of the overlapping commutation intervals if the size of the reactors is to be kept within relatively small limits. To this end, each switching reactor has been given an auxiliary winding in series connection with the pertaining contact device or with a synchronously operating auxiliary contact; and this series connection has been connected across the input terminals of the commutation-overlap regulating means. In this manner, the regulating means respond to the current produced within the time integral of the voltage at the switching reactors from the beginning of the magnetization reversal in these reactors to the opening moment of the contact device; and if the overlap (commutation) interval is adjusted or regulated for constancy of this time integral of current, favorable switching out conditions are always obtained, particularly with respect to opening of the contacts during the interval of weak current passage therethrough. However, these known apparatus are not equally reliable as regards the switching-in operations. It has been found that in such apparatus the measuring or regulating means are affected not only by the above-mentioned time integral but are also subject to the time integral of the voltage obtaining immediately after the closing moment of the contact device if this moment occurs before the switching reactor has reached its saturated condition. This may happen, for instance, if the output voltage of the converter is controlled. As above mentioned, by varying the switching-in magnetization of the switching reactor. With such a control, the time integral of the voltage occurring at the closing moment of the contact device may become relatively large and hence may interfere with the desired control or regulation of the overlapping commutation intervals.

It is an object of my invention to obviate this deficiency. Another, more specific object is to provide a plural-phase contact converter with an automatic control of its commutation intervals for optimum operating efficiency whose performance is substantially independent of changes in converter output voltage, no matter how such changes may have come about.

To achieve these objects, and in accordance with my invention, I connect the control or measuring circuit, such as the input circuit of the commutation overlap regulator, with a plurality of shunt circuits, each extending across one of the respective commutation switches of the contact converter; and I provide each of these shunt circuits with electric valve means in series connection with an auxiliary coil of the switching reactor. As a result, the time integral of any voltage occurring immediately subsequent to the contact closing moment can be made ineffective so that the commutation overlap regulator to be controlled remains responsive only to (1) the time integral of the voltage from the beginning of the current-wave step to the opening moment of the contact device and (2) the time integral of the voltage occurring from the closing moment of the next-sequential contact device to the beginning of the current-wave step in the pertaining phase. Due to the magnetically god iron of the reactor cores, the value of the latter integral (2) is very small and hence negligible so that the response is dependent substantially only upon the first-mentioned integral (1) thus securing the desired reliability of controlling performance regardless of changes in converter output voltage. A single valve means in each shunt circuit is sufficient if this valve is directly series connected in the input circuit of the regulator to be controlled. According to another feature of my invention, however, a plurality of valve members may also be connected with commutation switches in the respective converter phases so that these valves are sequentially connected in the circuit of the regulator to be controlled.

Figure 2:
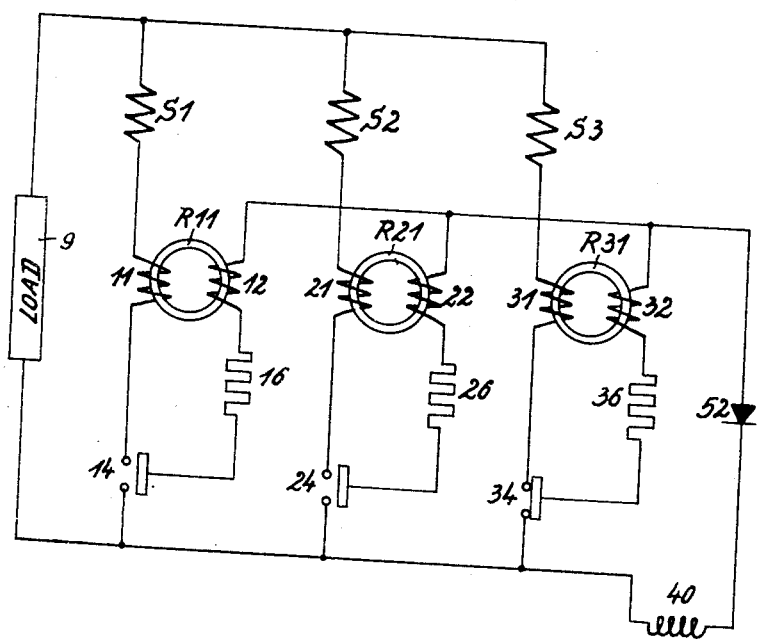

The foregoing and other objects and features of the invention will be apparent from the following description of the embodiments illustrated by way of example on the drawing in which Fig. 1 is a schematic circuit diagram of a contact rectifier, while Fig. 2 shows a simplified diagram of the basic circuit connections pertaining to a modified contact rectifier.

Referring to the apparatus illustrated in Fig. 1, the input terminals L1, L2 and L3 for connection to a three-phase alternating-current supply line are attached to the primary winding T1, T2, T3 of a power transformer whose secondary windings are denoted by S1, S2, and S3. The main winding 10 of a saturable switching reactor R10 and the main winding 11 of another saturable switching reactor R11 are connected in series relation to the secondary S1. Reactor R11 is equipped with an auxiliary coil 12. A synchronous switching device has two sequentially operated movable commutation switches 13 and 14 series connected with respective windings 10 and 11 for alternately connecting the phase circuit of secondary S1 with the buses P and N of a direct-current output circuit from which a load, schematically shown at 9, is to be energized.

The second and third phase circuits of respective transformer secondaries S2 and S3 are similarly designed. That is, each of these circuits contains the main windings 20, 21 or 30, 31 of respective saturable switching reactors R20, R21 and R30, R31. Reactors R21 and R31 have respective auxiliary windings 22, 32. Each of the main reactor windings is series connected to a switching device with two sequentially commutation switches 23, 24 or 33, 34. As will be described in a later place, all movable contact bridges of the commutation switches are driven in synchronism with the alternating current so that the contact devices as a whole operate as a commutating rectifier with overlapping switching intervals (commutation intervals).

The movable contact bridge of the commutation switch 14 and one of the fixed contacts of said switch are shunted by a circuit which includes the above-mentioned auxiliary coil 12 of reactor R11 in series with a valve 15 and in series with a current limiting resistor 16. This circuit also includes the control coil 40 of an overlap regulator 41. The overlap relay 41 has two other shunt circuits correspondingly connected with the commutation switches 24 and 34 of the second and third phase circuits 52 and 53, respectively. One of the two other shunt circuits is connected with commutation switch 24 through the reactor winding 22, a valve 25 and a resistor 26. The remaining shunt circuit is connected to commutation switch 34 through reactor winding 32, a valve 35 and a resistor 36. The three shunt circuits thus form three sequentially operated branches of the measuring circuit for controlling the regulator 41. The valves 15, 25 and 35 may consist of barrier-layer rectifiers, although electronic tubes are also applicable. All three valves have the same polarity of connection relative to the regulator control coil 40.

The synchronous drive for the switching devices may be given any suitable design, for instance on a mechanical or electromagnetic principle, and is equipped with means for adjusting or regulating the contact closing intervals. Various means for obtaining such a regulation are known, and it should be understood that the drive and regulating mechanisms D1, D2, D3 shown in Fig. 1 and described presently are presented only by way of example and may be replaced by devices of other design or type if desired. As shown in Fig. 1, the mechanism D1 for actuating the movable contact bridges of the commutation switches 13 and 14 is driven by a synchronous motor 43 which receives energization from the alternating current terminals L1, L2 and L3 and hence operates the contacts in the rhythm of the alternating current to be rectified. The motor 43 drives an eccentric 44 which reciprocates a member 45 linked at 46 to a rocker 47. Rocker 47 is pivoted on an eccentric 48 firmly mounted on a shaft 49. The motion of rocker 47 is transmitted to contacts 13 and 14 by two respective tappets 50 and 50'.

The switching devices comprising the contacts 23, 24 and the contacts 33, 34 are also driven from the motor 43 by respective mechanisms D2 and D3 which are similar to the mechanism D1 and hence are only partially illustrated. Mechanism D2 has a rocker 57 pivoted on an eccentric 58 and driven by a link 55 to periodically actuate the contacts 23 and 24 through respective tappets 60 and 60'. Mechanism D3 has a rocker 67 pivoted on an eccentric 68 and driven by a link 65 to actuate contacts 33 and 34 through respective tappets 70 and 70'. The eccentrics 58 and 68 are firmly mounted on shaft 49 in the same angular position as the eccentric 48. Shaft 49 is connected with the regulator 41 and angularly displaceable in dependence upon the energizing of the regulator control coil 40. Any angular displacement of the shaft 49 simultaneously raises or lowers the pivot axes of all rockers 47, 57, 67 relative to the stationary contacts of the pertaining switching device, thereby changing the closing intervals and hence the commutation intervals. The links 55 and 65 are driven from motor 43 by respective eccentrics (not shown) that correspond to eccentric 44 and are firmly mounted on the same shaft as the eccentric 44 with 120° angular displacement relative to each other and relative to eccentric 44. Consequently, the three rockers 48, 58 and 68 oscillate in the cyclical sequence to operate the respective contact devices with the mutual phase displacement needed for the commutating rectifier operation.

Although any one of a number of known electro-mechanical regulators for turning a shaft in response to variations of current could be employed in the embodiment illustrated in Fig. 1, a hydraulic regulator 41 is shown. The regulator 41 comprises a cylindrical oil chamber 79 divided into two parts 81 and 82 by a rotative radial dividing member 80 fixed to the control shaft 49. Spaced oil conduits 83 and 84 communicate respectively with the oil chamber parts 82 and 81 at each side of a fixed chamber-dividing partition 92. The conduits 83 and 84 communicate respectively with the upper and lower interior portions of a cylinder member 93 within which is slidably disposed a piston member having corresponding upper and lower interior pistons 95, 96 and upper and lower cylinder sealing heads 97, 98. Oil under pressure is supplied to the central portion of the cylinder 93 through a conduit 85. The control coil 40 comprises the winding of a U-shaped electromagnetic core 99 cooperatively disposed with respect to an armature member 87 fixed to the end of the piston member and adapted to move said member in and out depending upon the magnitude of current through the control coil 40. The positions of the pistons 95, 96 in the cylinder member 93 in turn control the flow of oil under pressure in conduit 81 to move the control shaft 49 clockwise or anticlockwise, depending upon which of the conduits is in communication with the oil pressure supply conduit 85. At the position of the piston illustrated in Fig. 1, oil is being forced into part 81 of the oil chamber 79 to turn the control shaft 49 clockwise. This in turn increases the switch closure intervals and, as a result, the average current through the control coil 40, whereby the armature member 87 together with the piston member will be moved upwardly to terminate this corrective control action at center position. A rheostat 86 having a movable contact 88 preferably is connected in series with the energizing circuit to the control coil 40 whereby adjustment of the balance position of the shaft 49 to optimum setting for a wide range of D. C. output voltage variation can be had.

During the operation of the contact rectifier, the regulator 41 operates to maintain a constant average value of the current flowing through its control coil 40. In this manner the rectifier apparatus automatically regulates its commutation intervals for optimum switching conditions, i. e., so that the respective contacts always are opened during the intervals of weak current therethrough, regardless of variations in rectified output voltage. Such variations may purposely be caused by a mechanical delayed-commutation control of the switching devices or by controlling the state of magnetization of the switching reactor at the circuit closing moment. A change in voltage may also be effected, for instance, by providing the power transformer of the apparatus with tapped windings to permit adjusting its secondary voltage. Of course, the regulation according to the invention is also effective in the event of uncontrolled voltage variations of the power supply line.

While in the embodiment shown in Fig. 1 each of the three branches of the control circuit is equipped with a separate valve, it is also possible to provide a single valve means in the circuit portion containing the control coil 40. This is illustrated in Fig. 2 in conjunction with a modified design of the rectifier circuit. The individual circuit elements in Fig. 2 are denoted by the same reference characters as the corresponding elements in Fig. 1 so that the design and operation of the modified apparatus will be understood from the foregoing. Aside from the regulator control coil 40, the drive and regulating means are not illustrated in Fig. 2 as they may be similar to those previously described. It will be noted that the three branches of the control circuit do not contain individual valve means. Instead, a single valve 52 is directly series connected with the control coil 40.

It will be understood from the foregoing by those skilled in the art that apparatus according to the invention may be modified in various respects and may differ in details from those specifically illustrated and described, without departing from the essence of the invention and within the scope of the claims annexed hereto.

I claim:

1. In a multi-phase commutating contact rectifier, the combination comprising a saturable switching reactor in each phase of the rectifier, a periodically opening commutation switch series-connected with said reactor, said switch comprising a pair of fixed contacts and a movable contact-bridging member, regulating means for controlling the commutation overlap of said commutation switches, said regulating means having an electro-responsive control coil, a control circuit having branches connected sequentially through the bridging member and a fixed contact of respective ones of said commutation switches, said control circuit comprising in each of said branches an auxiliary winding on the pertaining one of said reactors, and diode rectifier means series-connected with said control coil in said circuit.

2. In a multi-phase commutating contact rectifier, the combination comprising a saturable switching reactor in each phase of the rectifier, a periodically opening commutation switch series-connected with said reactor, said switch comprising a pair of fixed contacts and a movable contact bridging member, regulating means for controlling the commutation overlap of said commutation switches, said regulating means having an electro-responsive control coil, a control circuit having branches connected sequentially through the bridging member and a fixed contact of respective ones of said commutation switches, said control circuit comprising in each of said branches an auxiliary winding on the pertaining one of said reactors, and a rectifier series-connected in said circuit in series with all said branches, said rectifiers having all the same polarity of connection relative to said control coil.

3. In a combination according to claim 1, said circuit having a portion series-connected with all said branches, and said diode rectifier means comprising a diode rectifier series-connected with said control coil in said circuit portion.

References Cited in the file of this patent
UNITED STATES PATENTS

| | | |
|---|---|---|
| 2,557,739 | Goldstein et al. | June 19, 1951 |
| 2,557,740 | Goldstein et al. | June 19, 1951 |